Feb. 7, 1928.

J. L. HOTT 1,658,199

FURNACE OF THE RECUPERATIVE TYPE

Filed Oct. 14, 1925

James Loewy Hott INVENTOR.

Witnesses:
N. F. Eyler
E. W. Scharis

Patented Feb. 7, 1928.

1,658,199

UNITED STATES PATENT OFFICE.

JAMES LOEWY HOTT, OF CANTON, OHIO.

FURNACE OF THE RECUPERATIVE TYPE.

Application filed October 14, 1925. Serial No. 62,410.

The present invention relates to furnaces of the metal recuperative type wherein the air employed for combustion is subjected to a preliminary heating in advance of its admission to the furnace combustion chamber.

The present invention proposes to save the cast iron and metallic recuperators from the disrepute into which they have come. For many years metal pipes have been placed into the flow of hot products of combustion and air passed through or around them so as to be heated. The pipes have always burned out and the recuperator consequently destroyed.

Figure 2:
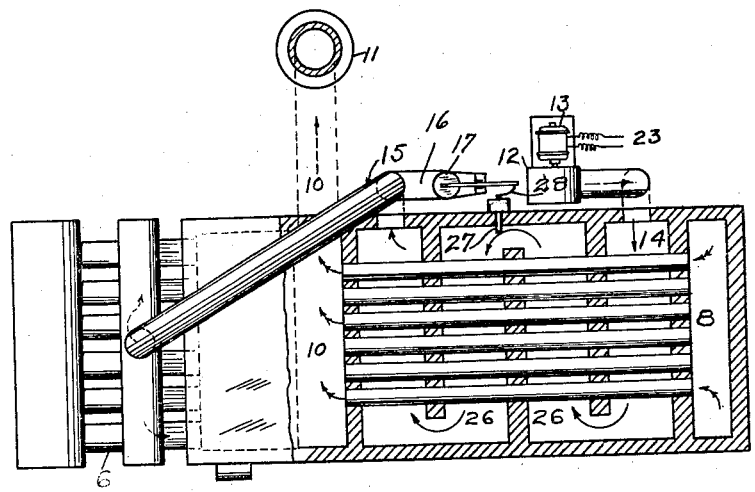
Figure 1:
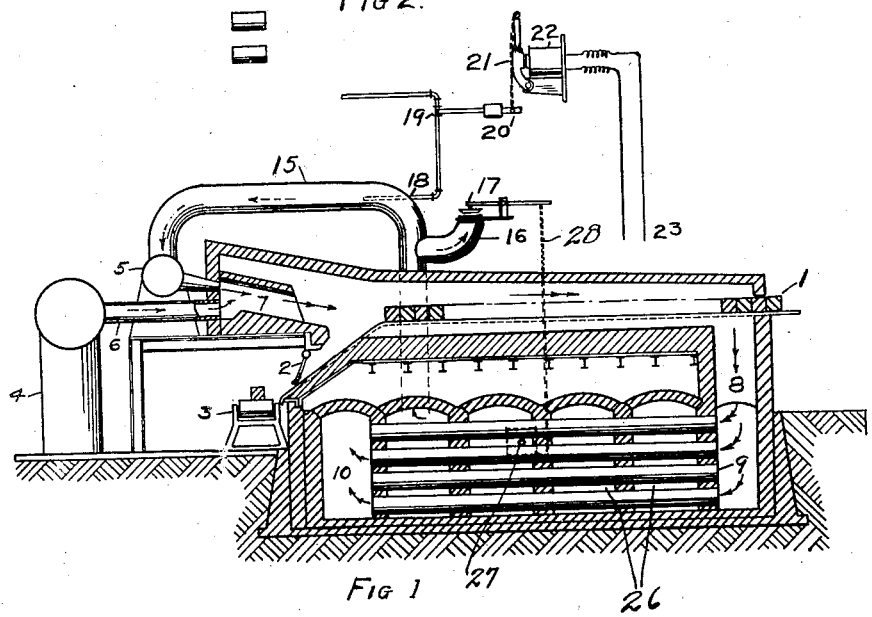
Figure 3:
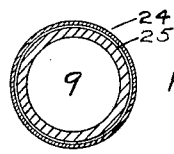

Fig. 1 is a sectional view through a furnace of the metal recuperative type, constructed in accordance with my invention; Fig. 2 is a horizontal sectional view through the portions lifted in elevation; and Fig. 3 is a detailed sectional view through one of the combustion or heat pipes.

The accompanying drawing shows an application of this invention to a continuous metal heating furnace. The billets, for example, to be heated are successively introduced broadside into the furnace as shown at 1, Fig. 1. They are then pushed by any suitable mechanism, which is well known, through the furnace towards the discharge end of the furnace; here they are discharged by gravity down an incline through door 2 and onto the table 3. Gas is supplied to the burner or port 7 by means of a header 4 and pipe 6 leading therefrom into said port. Air is admitted into the port 7 from a header 5. Gas and air introduced through port 7 burns at the discharge end of the furnace and the products of combustion pass in the direction of the arrows toward the charging end of the furnace and gradually heat up the billets. The flue gases are then directed downwardly through downtake 8, through heating tubes or pipes 9 of the recuperator and out through the flue 10 to the stack 11. The air supplied for combustion is preheated by being passed around these pipes through the chamber 26. Constructions somewhat similar to this have been used for many years but they have not been successful for the following reasons.

First. At times during the operation of a furnace it is necessary to shut practically all of the air off of a furnace. This is necessary to prevent the furnace from becoming too hot and from having an oxidizing flame. The gas is very often left on to prevent scale and enough air finds its way into the course of the flue gas to cause the gas to partially burn. The heat thus generated causes the recuperator tubes to become too hot and they are destroyed, since no air is circulating around them.

Second. Steel pipe has been used in recuperator constructions but the corrosion and heat from the exposed flame striking the bare tubes have quickly destroyed them. This disadvantage has not been met in cast iron recuperator constructions.

Third. Explosions in recuperators are very frequent due to the combustion air supply failing and the gas being forced into the air pipe and air heating chambers before it is detected. The gas mixes with the air and very disastrous explosions have occurred.

The above disadvantages have caused the metallic recuperators to be practically abandoned. This invention is designed to overcome these disadvantages and will save the cast iron recuperators. To protect the recuperator from excessive heat as described above, I have provided an air bleeder which is placed between the air recuperator and the air inlet to the furnace. This bleeder is shown at 16, Fig. 1. This bleeder is a by-pass which will allow air to pass through the recuperator but not enter the furnace combustion chamber and so keep the metal recuperator at the desired temperature. The bleeder is in operation any time the temperature of the recuperator reaches a point which endangers the structure of same. The air heating chambers 26 are provided with thermo-couples and instruments such as is depicted at 27, to indicate the temperature of the pipes. The bleeder valve may be operated automatically from one of these thermo-couples through connecting means 28. When I have used steel pipes 9 I have protected them from the corrosion of furnace gases by lining them on the inside with a refractory sleeve 24. This is shown in Figure 3. The tile sleeve is slid into the pipes and grouted with fireclay 25. Heat is readily conducted through this lining but no corrosion of the tubes may take place due to contact with flue gas.

In case the air supply fails due to unpreventable causes mechanically, gas may back into the air line and recuperator chambers and there cause serious explosions. In order to prevent these explosions a jet of steam or air is introduced through pipe 18 into the air pipe 15 so that this jet will act in the capacity of an auxiliary device to maintain the circulation of air through the recuperator chambers and prevent any gas from finding its way into the air chamber. This jet is automatically operated by means of a magnet 22 connected to the power circuit of the fan motor 13 by the wires 23. When the power goes off, the magnet will release the arm 21 Fig. 1 and allow the lever 20 to fall and open the jet valve 19 in the pipe 18.

In the operation of the improved furnace the gas and air enter the port 7 and are discharged therefrom into the combustion chamber of the furnace, where the combustion takes place in opposition to the movement of the billets 1, the products of combustion passing downwardly through flue 8 and thence through the combustion or heating tubes 9 and out through flue 10 to the stack 11. The billets are introduced into the furnace at 1 and gradually pushed through the furnace and heated up and then discharged through door 2 onto the table 3. Underneath the combustion chambers are the recuperative chambers 26 heated by the pipes 9 through which the products of combustion from the furnace pass on their way to the flue 10 and stack 11. The air supplied for combustion is blown through the chambers 26 by the fan 12 Fig. 2 and is heated before being conducted to the furnace through pipe 15 and pipe 5. If the recuperator becomes too hot the bleeder valve 17 Fig. 1 is opened and an additional amount of air is allowed to be blown through the recuperator but does not reach the combustion chamber. If the power goes off of the fan magnet 22 Fig. 1 will release the arm 21, the lever 20 suspended from this arm will drop and open the steam valve 19 and introduce a jet of steam into the air pipe 15 to thereby maintain the flow or current of air through the recuperator chambers.

Various other applications may be made of this invention without departing from the main idea of the method of bypassing the required amount of air through the recuperator and the protection of same from corrosion and overheating.

Having thus described the various features of my invention, what I desire to secure by Letters Patent, is:—

1. In a recuperative furnace, a combustion chamber, a recuperator chamber, heating tubes disposed in the recuperator chamber and serving to conduct the products of combustion away from the combustion chamber, an air supply conduit for conducting the heated air from the recuperator chamber to the combustion chamber for supporting combustion therein, pressure means for creating a flow of air from the recuperator chamber through the air supply conduit to the combustion chamber, and temperature controlled means for diminishing the air supply to the combustion chamber without varying the flow of air through the recuperator chamber whereby the fire tubes are cooled by a substantially uniform volume of air through the recuperator chamber.

2. In a recuperative furnace, a combustion chamber, a recuperator chamber, heating tubes disposed in the recuperator chamber and serving to conduct the products of combustion away from the combustion chamber, an air supply conduit for conducting the heated air from the recuperator chamber to the combustion chamber for supporting combustion therein, pressure means for creating a flow of air from the recuperator chamber through the air supply conduit to the combustion chamber, and means operable according to the intensity of the heat in the recuperator chamber for diminishing the air supply to the combustion chamber without varying the flow of air through the recuperator chamber.

3. In a recuperative furnace, a combustion chamber, a recuperator chamber, heating tubes disposed in the recuperator chamber and serving to conduct the products of combustion away from the combustion chamber, an air supply conduit for conducting the heated air from the recuperator chamber to the combustion chamber for supporting combustion therein, pressure means for creating a flow of air from the recuperator chamber through the air supply conduit to the combustion chamber, a thermo-couple arranged in the recuperator chamber, and means operable by the thermo-couple for varying the supply of air to the combustion chamber according to the intensity of the heat in the recuperator chamber and without varying the flow of air through the said recuperator chamber.

4. In a recuperative furnace, a combustion chamber, a recuperator chamber, heating tubes disposed in the recuperator chamber and serving to conduct the products of combustion away from the combustion chamber, an air supply conduit for conducting the heated air from the recuperator chamber to the combustion chamber for supporting combustion therein, pressure means for creating a flow of air from the recuperator chamber through the air supply conduit to the combustion chamber, a bleeder device inserted in said air supply conduit for bleeding the same, and heat influenced means adapted to be acted upon by the heat in the recuperator chamber for controlling the bleeder device.

5. In a recuperative furnace, a combustion chamber, a recuperator chamber, heating tubes disposed in the recuperator chamber and serving to conduct the products of combustion away from the combustion chamber, an air supply conduit for conducting the heated air from the recuperator chamber to the combustion chamber for supporting combustion therein, pressure means for creating a flow of air supply from the recuperator chamber through the air supply conduit to the combustion chamber, and auxiliary means automatically operable upon said pressure means being rendered inoperative for maintaining a flow of air through the recuperator chamber.

6. In a recuperative furnace, a combustion chamber, a recuperator chamber, heating tubes disposed in the recuperator chamber and serving to conduct the products of combustion away from the combustion chamber, an air supply conduit for conducting the heated air from the recuperator chamber to the combustion chamber for supporting combustion therein, pressure means for creating a flow of air supply from the recuperator chamber through the air supply conduit to the combustion chamber, a normally inoperative device adapted to create a current of air through the recuperator chamber, and means operable upon said pressure means becoming disabled for rendering said auxiliary means operative.

7. In a recuperative furnace, a combustion chamber, a recuperator chamber, heating tubes disposed in the recuperator chamber and serving to conduct the products of combustion away from the combustion chamber, an air supply conduit for conducting the heated air from the recuperator chamber to the combustion chamber for supporting combustion therein, pressure means for creating a flow of air supply from the recuperator chamber through the air supply conduit to the combustion chamber, said pressure means embodying an electric motor, auxiliary means for creating a flow of air through the recuperator chamber, and means for rendering said auxiliary means normally inoperative and including an electro-magnetic device in circuit with said electric motor for releasing said auxiliary means when said motor is rendered inoperative.

JAMES LOEWY HOTT.